United States Patent [19]

Keys

[11] Patent Number: 5,221,564
[45] Date of Patent: Jun. 22, 1993

[54] INTEGRAL HYBRID MOLDING AND WEATHERSTRIP

[75] Inventor: James F. Keys, West Bloomfield, Mich.

[73] Assignee: The Standard Products Company, Cleveland, Ohio

[21] Appl. No.: 431,295

[22] Filed: Nov. 3, 1989

[51] Int. Cl.$^5$ .............................. B60R 13/06
[52] U.S. Cl. ........................ 428/31; 264/177.2; 428/122; 428/358
[58] Field of Search ............ 428/7, 122, 358, 31; 49/475; 52/399; 292/DIG. 70; 296/93; 264/177.2

[56] References Cited

U.S. PATENT DOCUMENTS

| | | | |
|---|---|---|---|
| 1,566,651 | 12/1925 | Christensen | 49/475 |
| 2,655,698 | 10/1953 | Chalik et al. | 49/489 |
| 3,079,653 | 3/1963 | Cornell | 49/493 |
| 3,131,441 | 5/1964 | Cornell | 49/493 X |
| 4,495,234 | 1/1985 | Tominaga et al. | 428/122 |
| 4,537,825 | 8/1985 | Yardley | 428/422 X |
| 4,586,552 | 5/1986 | Labelle | 49/489 X |
| 4,603,899 | 8/1986 | Iwasa | 428/122 X |
| 4,697,327 | 10/1987 | Adell | 49/462 X |
| 4,708,351 | 11/1987 | Midooka et al. | 49/475 X |
| 4,771,816 | 9/1988 | Clay, Jr. | 160/235 |
| 4,787,668 | 11/1988 | Kawase et al. | 52/403 X |

FOREIGN PATENT DOCUMENTS

| | | | |
|---|---|---|---|
| 0372745 | 6/1990 | European Pat. Off. | 428/122 |
| 3239082 | 4/1984 | Fed. Rep. of Germany, | 428/7 |
| 2292100 | 6/1976 | France | 428/122 |
| 2427526 | 12/1979 | France . | |
| 2492939 | 4/1982 | France | 428/122 |

Primary Examiner—Henry F. Epstein

[57] ABSTRACT

An integral hybrid molding and weatherstrip for attachment to a vehicle includes a core member and a first layer extruded to the core member. A second layer abuts the first layer at one edge thereof, and is extruded to the core member. The first and second layers are of a thermoset and thermoplastic material which is co-extruded in-line.

8 Claims, 2 Drawing Sheets

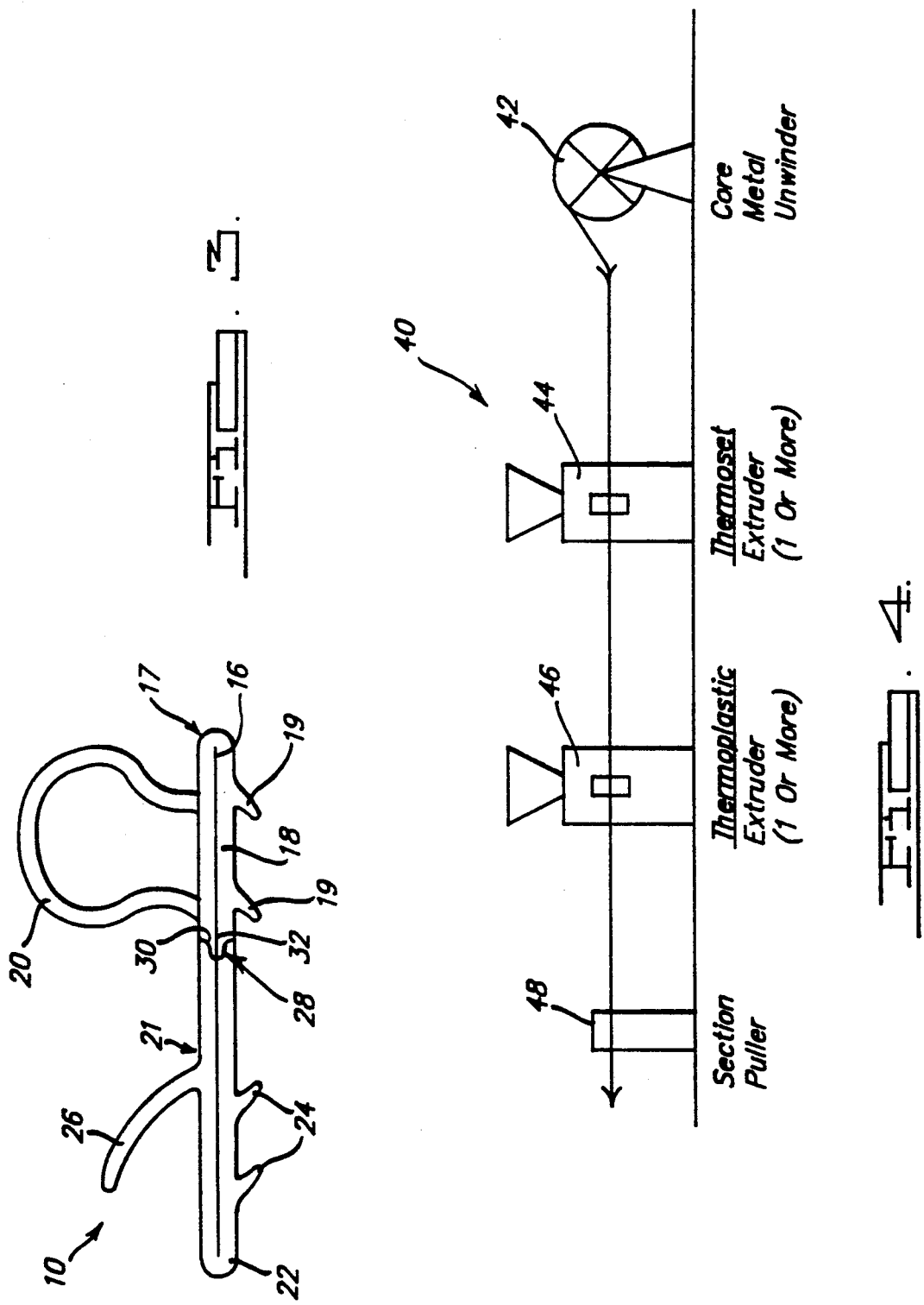

INTEGRAL HYBRID MOLDING AND WEATHERSTRIP

BACKGROUND OF THE INVENTION

The present invention relates to moldings and weatherstrips for attachment to a vehicle. More particularly, the present invention relates to an integral hybrid molding and weatherstrip which can be in-line co-extruded.

Weatherstrips are well known for use with automotive vehicles and are typically made of thermoset synthetic elastomeric materials because of the desirable physical properties of such materials. All parts of the weatherstrip are taught to be formed from the same kind of rubber, such as EPDM and SBR. Molding are also well known for use with automatic vehicles and are typically made of thermoplastic material such as PVC. However, a problem results when attempting to form an integral hybrid molding and weatherstrip due to poor bonding or lack thereof between PVC and rubber material. In order to form an integral hybrid molding and weatherstrip, it has been know to pre-extrude the PVC molding, pre-extrude the rubber weatherstrip, and adhesively bond the two extrusions together at the end of the process. However, this process results in considerable time expenditures, cost expenditures and material handling problems.

It is, therefore, one object of the present invention to provide a method of forming an integral hybrid molding and weatherstrip.

It is another object of the present invention to co-extrude in-line a thermoplastic and thermoset material.

It is yet another object of the present invention to provide a process which is less time consuming and costly, and decreases the amount of material handling.

SUMMARY OF THE INVENTION

The present invention is an integral hybrid molding an weatherstrip for attachment to a vehicle. A core member has a first layer of thermoset material secured along one portion thereof and a second layer of thermoplastic material secured along another portion thereof. A means joins the first and second layers together such that the first and second layers can be in-line co-extruded to present an integral hybrid molding and weatherstrip.

Additionally, a method is provided for making an integral hybrid molding and weatherstrip for attachment to a vehicle including the steps of: forming a core member to a predetermined configuration; pulling the core member; extruding a first layer of a thermoset material to one portion of the core member; extruding a second layer of a thermoplastic material to a different portion of the core member; and joining the first and second layers together along a common edge such that the first and second layers can be in-line co-extruded to present an integral hybrid molding and weatherstrip.

Accordingly, one advantage of the present invention is that it allows a thermoplastic and thermoset material to be co-extruded in-line to form an integral hybrid molding and weatherstrip. Another advantage of the present invention is that the in-line co-extruding process results in less material handling, and cost and time expenditure since the integral hybrid molding and weatherstrip can be formed in one process.

Other advantages of the present invention will be readily appreciated as the same becomes better understood by reference to the following description when considered in connection with the accompanying drawings.

BRIEF DESCRIPTION OF THE DRAWINGS

FIG. 3 is a view similar to FIG. 2 prior to forming the integral molding and weatherstrip to the configuration of FIG. 2.

FIG. 4 is a schematic view of an apparatus for forming the integral molding and weatherstrip of FIG. 3.

DESCRIPTION OF THE PREFERRED EMBODIMENT

Figure 1:
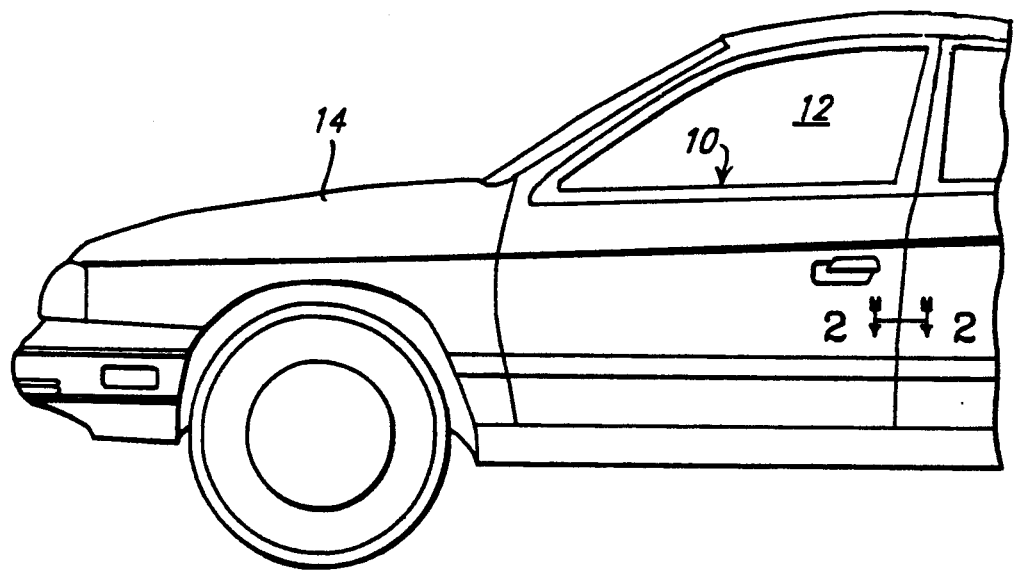
FIG. 1 is an elevational view of a preferred embodiment of an integral molding and weatherstrip of the present invention attached to a vehicle shown broken away.
Figure 2:
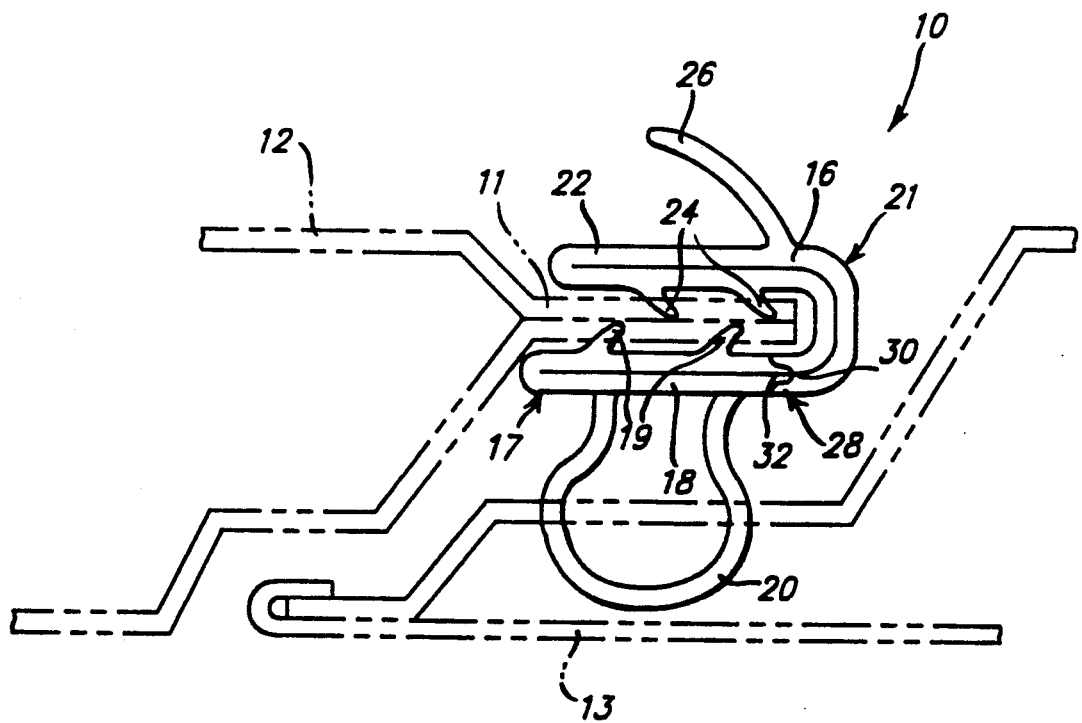
FIG. 2 is a sectional view along line 2—2 of FIG. 1.

A preferred embodiment of an integral hybrid molding and weatherstrip for attachment to a vehicle is generally shown at 10 in FIGS. 1 and 2. The integral hybrid molding and weatherstrip 10 is typically a door seal along a flange 11 of a door opening 12 to engage the edge of a door 13 of a vehicle 14. It should be appreciated that the integral molding and weatherstrip 10 may be used as a typical belt weatherstrip or glass run channel.

Referring to FIGS. 2 and 3, the integral hybrid molding and weatherstrip 10 includes a core member 16 which may be formed to a generally flat or planar configuration for engaging the flange 11 of the door opening 12. The core member 16 is preferably made of a metal material and may be solid, perforated, lanced and stretched, wire or laminate flexible as is known in the art.

The integral hybrid molding and weatherstrip 10 includes a first layer, generally indicated at 17, secured along one side of the core member 16. The first layer 17 is made of a thermoset material, which is preferably an elastomeric material such as EPDM or SBR rubber. The first layer 17 has a base portion of 18 of a dense type material with a pair of spaced flanges 19 along one side for engaging or contacting the flange 11 of the door opening 12. The first layer 17 has a generally tubular portion 20 of a sponge type material along the other side for engaging and contacting the door 13.

The integral hybrid molding and weatherstrip 10 includes a second layer, generally indicated at 21, which abuts one edge of the first layer 17 and which is secured along one side or portion of the core member 16. The second layer 21 is made of a thermoplastic material such as polyvinyl chloride (PVC). The second layer 21 has a base portion 22 with a pair of spaced flanges 24 along one side for engaging the flange 11 of the door opening 12. The base portion 22 also has an outwardly extending generally accurate flap 26 along the other side.

The first and second layers 17 and 21, respectively, are co-extruded in-line to the core member 16 at joint 28. The second layer 21 may have a groove 30 extending longitudinally along one edge at joint 28. The first layer 17 may have a corresponding projection or tongue 32 extending longitudinally along an edge adjacent to the grooved edge of the second layer 21 at joint 28. The projection 32 is disposed in the groove 30 and secured together by means such as a chemical adhesive. It should be appreciated that the first layer 17 may be joined to the second layer 21 by any suitable means such as a mechanical overlap or adhesion promoter. It should also be appreciated that the second layer 21 could have the projection 32 and the first layer 17 have the groove 30. It should further be appreciated that the first layer 17 may be formed along both sides of the core member 16 with a void therebetween and the second layer 21 having a base portion 22 with only flap 26 subsequently filling the void. As a result, the spaced flanges 19 and 24 would be made of the same thermoset material as the first layer 17.

Accordingly, a process or method is provided for making an integral hybrid molding and weatherstrip 10 for attachment to a vehicle 14. Referring to FIG. 4, an apparatus 40 for performing the method is shown. The apparatus 40 includes a core unwinder 42, at least one first or thermoset extruder 44, at least one second or thermoplastic extruder 46 and a section puller 48 for pulling the core member 16 through the extruders 44 and 46. It should be appreciated that the core unwinder 42, extruders 44 and 46, and section puller 48 are in a generally straight line to allow in-line extrusion. It should also be appreciated that additional equipment such as a roll former may be used depending on the particular application.

The method comprises the steps of forming a core member 16 to a predetermined configuration such as planar by unwinding the core member 16 as a continuous metal material from the core unwinder 42. The steps include extruding a first layer 17 of thermoset material to the core member 16 with at least one first or thermoset extruder 44 along one side of the core member 16. The extruder 44 may include metal guides (not shown) for maintaining the core member 16 along the in-line direction. The dies (not shown) of the extruder 44 may be shaped to form the projection 32. It should be appreciated that the extruder 44 is heated to allow the thermoset material to flow and be extruded.

The steps also include extruding a second layer 21 of thermoplastic material to the core member 16 with at least one second or thermoplastic extruder 46 along the other side of the core member 16. The extruder 46 is similar to the extruder 44 and is conventional in the art. The steps further include joining the first layer 17 and second layer 21 together by applying an adhesive with an adhesive applicator to the first layer 17 prior to the second extruder 46. It should be appreciated that any suitable means may be used to join the first and second layers 17 and 21 together. However, when adhesive is used, the adhesive keeps moisture out of the joint 28 to prevent the core member 16 from oxidizing or rusting. The steps include moving the core member 16 and integral hybrid molding and weatherstrip 10 through the extruders 44 and 46 with a section puller 48.

The present invention has been described in an illustrative manner, and it is to be understood that the terminology which has been used is intended to be in the nature of words and description rather than of limitation.

Obviously, many modifications and agitations the present invention are possible in light of the above teachings. It is, therefore, to be understood that within the scope of the appended claims, the present invention may be practiced otherwise than as specifically described.

What is claimed is:

1. An integral hybrid molding and weatherstrip for attachment to a vehicle, comprising:
   a core member;
   a first layer secured directly to said core member;
   a second layer secured directly to said core member; and
   said first and second layers being of dissimilar material and having been extruded sequentially in-line directly onto said core member, with said core member extending continuously through both of said first and second layers and through an interface therebetween.

2. An integral hybrid molding and weatherstrip as set forth in claim 1, wherein said first layer is composed of thermoplastic material.

3. An integral hybrid molding and weatherstrip as set forth in claim 2, wherein said second layer is composed of thermoset material.

4. An integral hybrid molding and weatherstrip as set forth in claim 3, wherein said core member is composed of a metal material.

5. An integral hybrid molding and weatherstrip as set forth in claim 1, including means for adhering said first and said second layers to one another at said interface therebetween.

6. An integral hybrid molding and weatherstrip as set forth in claim 5, wherein one of said first and second layers includes a groove extending along said interface therebetween, and wherein the other of said first and second layers includes a projection extending into said groove.

7. An integral hybrid molding and weatherstrip as set forth in claim 6, wherein said adhering means includes an adhesive applied to at least one of said groove and said projection.

8. An integral hybrid molding and weatherstrip for attachment to a vehicle, comprising:
   a core member;
   a first layer secured directly to said core member;
   a second layer secured directly to said core member;
   said first and second layers being composed of dissimilar material and having been extruded sequentially in-line directly onto said core member, with said core member extending continuously through both of said first and second layers and through an interface therebetween;
   means for adhering said first and second layers to one another at said interface therebetween;
   wherein said first layer is composed of a thermoplastic material;
   wherein said second layer is composed of a thermoset material;
   wherein said core member is composed of a metal material; and
   one of said first and second layers includes a groove extending along said interface therebetween, and wherein the other of said first and second layers includes a projection extending into said groove.

* * * * *

UNITED STATES PATENT AND TRADEMARK OFFICE
CERTIFICATE OF CORRECTION

PATENT NO. : 5,221,564
DATED : June 22, 1993
INVENTOR(S) : James F. Keys

It is certified that error appears in the above-indentified patent and that said Letters Patent is hereby corrected as shown below:

| | |
|---|---|
| Col. 1, line 15 | "and" should be --or-- |
| Col. 1, line 15 | "Molding" should be --Moldings-- |
| Col. 1, line 16 | "automatic" should be --automotive-- |
| Col. 1, line 21 | , "material" should be --materials-- |
| Col. 1, line 22 | "know" should be --known-- |
| Col. 1, line 32 | "an" should be --and-- |
| Col. 2, line 9 | after "view" insert --taken-- |
| Col. 2, line 31 | after "configuration" insert --and later formed or bent to a generaly U-shaped configuration-- |
| Col. 2, line 56 | , "accurate" should be --arcuate-- |
| Col. 3, line 12 | " should be --the-- |
| Col. 3, line 57 | "and" should be --of-- |
| Col. 3, line 59 | "agitations" should be -variations-- |

UNITED STATES PATENT AND TRADEMARK OFFICE
CERTIFICATE OF CORRECTION

PATENT NO. : 5,221,564
DATED : June 22, 1993
INVENTOR(S) : James F. Keys

It is certified that error appears in the above-indentified patent and that said Letters Patent is hereby corrected as shown below:

Col. 4, line 11, claim 1 , "material"
    should be --materials--

Col. 4, line 45, claim 8 "material"
    should be --materials--

Signed and Sealed this

Twelfth Day of April, 1994

Attest:

BRUCE LEHMAN

*Attesting Officer*     *Commissioner of Patents and Trademarks*